United States Patent [19]

Hitomi et al.

[11] Patent Number: 4,543,931
[45] Date of Patent: Oct. 1, 1985

[54] ENGINE INTAKE SYSTEM

[75] Inventors: Mitsuo Hitomi; Hiroyuki Oda, both of Hiroshima, Japan

[73] Assignee: Mazda Motor Corporation, Japan

[21] Appl. No.: 566,440

[22] Filed: Dec. 28, 1983

[30] Foreign Application Priority Data

Dec. 29, 1982 [JP] Japan .................. 57-233394

[51] Int. Cl.⁴ .............. F02B 31/00; F02B 25/06
[52] U.S. Cl. ................. 123/308; 123/315; 123/661; 123/52 M
[58] Field of Search ........... 123/308, 432, 315, 661, 123/52 M

[56] References Cited

U.S. PATENT DOCUMENTS

| | | | |
|---|---|---|---|
| 3,180,326 | 4/1965 | Rascov | 123/432 |
| 3,938,482 | 2/1976 | Akamatsu | 123/315 |
| 3,991,729 | 11/1976 | Notaro | 123/432 |
| 3,993,037 | 11/1976 | Mukai et al. | 123/432 |
| 4,181,105 | 1/1980 | Takemoto et al. | 123/308 |
| 4,240,387 | 12/1980 | Motosugi et al. | 123/432 |
| 4,271,803 | 6/1981 | Nakanishi et al. | 123/432 |
| 4,340,019 | 7/1982 | Barnert et al. | 123/432 |
| 4,351,298 | 9/1982 | Franke | 123/432 |
| 4,445,473 | 5/1984 | Matsumoto | 123/308 |

FOREIGN PATENT DOCUMENTS

| | | |
|---|---|---|
| 50-107309 | 8/1975 | Japan . |
| 54-65207 | 5/1979 | Japan . |
| 168020 | 10/1982 | Japan ................. 123/432 |

Primary Examiner—E. Rollins Cross
Attorney, Agent, or Firm—Murray, Whisenhunt and Ferguson

[57] ABSTRACT

An improved intake system in an internal combustion engine of a high compression ratio capable of producing a swirl of air-fuel mixture so as to increase the combustion speed thereof for improved combustion efficiency and hence fuel economy during light-load operation of the engine, and at the same time of effectively suppressing the generation of a swirl so as to reduce the level of combustion noises to a substantial extent during heavy-load operation of the engine at full-open throttle. The engine has a combustion chamber defined in a recess in the cylinder head above the top of a piston, slidably received in a cylinder bore in the cylinder block, at its top dead-center, with a squish area of a limited clearance formed adjacent the combustion chamber in the cylinder bore between the cylinder head and the piston. An intake passage in the cylinder head leading to the combustion chamber for supply of air-fuel mixture comprises a light-load intake passage for admitting the mixture into the combustion chamber or the squish area in the circumferential direction of the cylinder bore so as to produce a swirl under light-load operation of the engine, and a heavy-load intake passage having a valve adapted to be closed during light-load operation of the engine and opened during heavy-load operation of the engine for admitting the mixture into the combustion chamber or the squish area in the direction parallel to the central axis of the cylinder bore so as to suppress the generation of a swirl.

15 Claims, 9 Drawing Figures

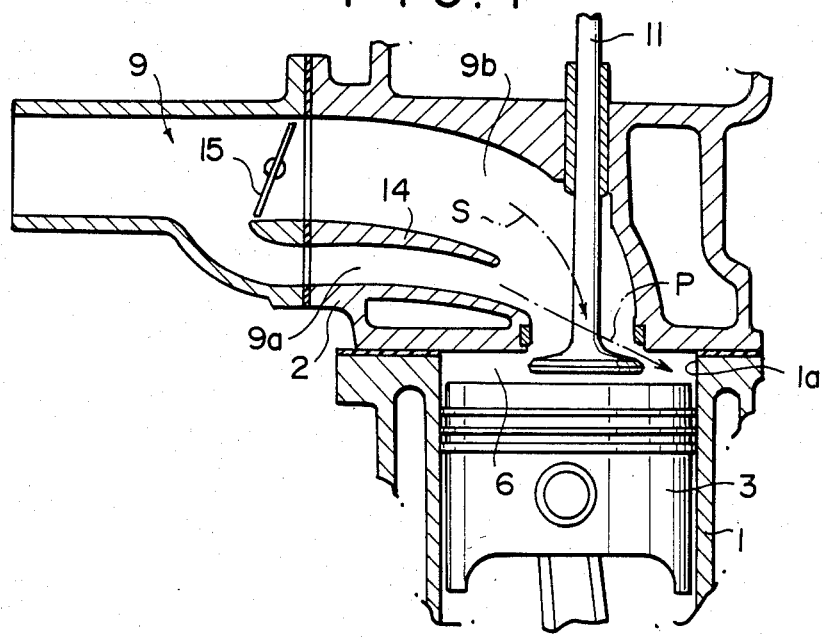
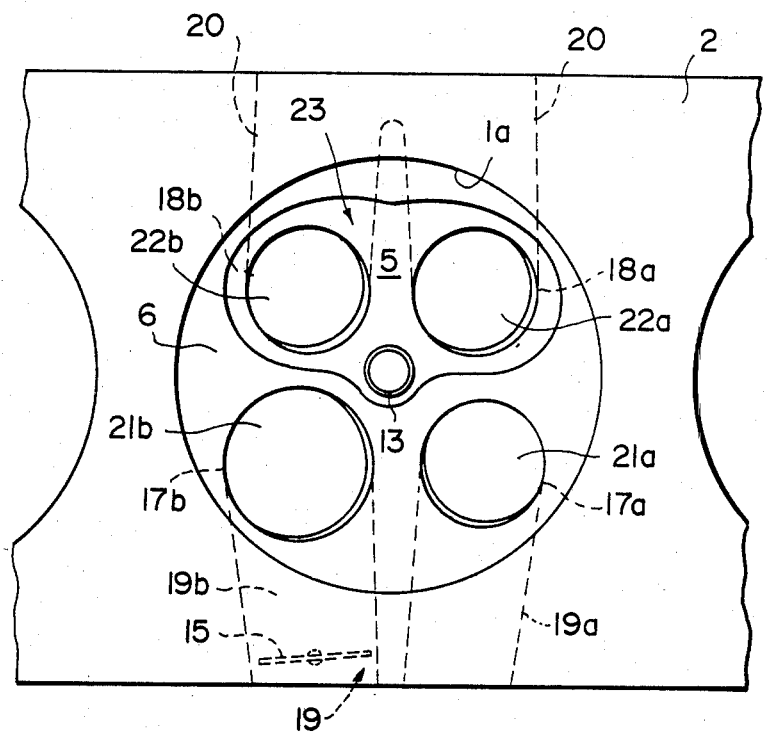

ENGINE INTAKE SYSTEM

BACKGROUND OF THE INVENTION

1. Field of the Invention

This invention relates to an improvement in an intake system of an internal combustion engine.

2. Description of the Prior Art

In the past, there have been proposed various types of four-cycle engines such as, for example, those disclosed in Japanese Unexamined Patent Publication Nos. 54(1979)-65207 and 50(1975)-107309, wherein an engine cylinder head is recessed at a location surrounding an intake port or an exhaust port and an ignition plug so as to provide a combustion chamber between the inner wall surface of the cylinder head and the top surface of a piston at its top dead-center, with a large squish area of a limited clearance formed adjacent the recess.

In the above-described engines, since the large squish area is provided, the mixture in the large squish area is pushed into the combustion chamber by the upward movement of the piston in the compression stroke, thereby creating a squish flow and a great disturbance of mixture. Hence, the combustion speed is enhanced and the combustion efficiency during the light-load operation is improved, thereby improving the fuel consumption.

Further, in the above-described engines, because of the compact combustion chamber, the flame-propagation distance is made short advantageously from the viewpoint of anti-knocking, whereby it is made possible to enlarge the compression ratio. By enlarging the compression ratio, the output power is enhanced and the fuel consumption is improved.

In the above-described engines, however, if a large squish area and a small combustion chamber are formed in order to sufficiently increase the combustion efficiency, the combustion noises are increased during the heavy-load operation demanding a large air intake.

On the other hand, the present invention have discovered that in the above-described type of engines the disturbance in the combustion chamber immediately before combustion is further enhanced if the air intake introduced in the intake stroke is guided in the direction along the periphery of the cylinder to form a strong swirl. However, if the swirl during the intake stroke is made strong enough for the light-load operation, the combustion noises during the heavy-load becomes too large.

SUMMARY OF THE INVENTION

In view of the above observations, the primary object of the present invention is to provide an improved and novel engine intake system for an engine provided with a compact combustion chamber and a large squish area which is capable of providing a sufficiently large combustion efficiency at the time of light-load operation when the air intake is small as well as decreasing or controlling the combustion noises at the time of heavy-load operation when the air intake is large.

The object is accomplished by designing the shape or structure of the combustion chamber such as the area of the squish area and thickness thereof, and the compression ratio to those which will make the combustion noises small during the heavy-load operation where, for instance, the throttle valve is fully opened, and on the other hand by creating a strong swirl in the intake stroke only during the light-load operation.

In order to achieve the above object, the present invention provides an improved engine intake system which comprises a cylinder block defining therein a cylinder bore; a piston slidably received in the cylinder bore; a cylinder head fixedly mounted on the cylinder block and having a recess formed in its inner wall at a location opposing the top of the piston; a combustion chamber defined in the recess in the cylinder head with a squish area of a limited clearance formed adjacent thereto between the inner wall surface of the cylinder head and the top surface of the piston at its top dead-center; intake port means in the cylinder head opening into either or both of the combustion chamber and the squish area; intake passage means in the cylinder head connected with the intake port means for feeding a charge of air-fuel mixture to the combustion chamber through the intake port means; exhaust port means in said cylinder head opening into either or both of the combustion chamber and the squish area; exhaust passage means in the cylinder head connected with the exhaust port means for discharging burned gas from the combustion chamber to the outside; the intake passage means comprising a light-load intake passage for introducing the mixture into the combustion chamber or the squish area in the circumferential direction of the cylinder bore so as to produce a swirl under light-load operation of the engine, and a heavy-load intake passage having an opening and closing valve adapted to be closed during light-load operation of the engine and opened during heavy-load operation of the engine for introducing the mixture into the combustion chamber or said squish area in the direction parallel to the central axis of the cylinder bore so as to suppress the generation of a swirl.

The above and other objects of the present invention will become apparent from the following detailed description of several preferred embodiments of the invention when taken in conjunction with the accompanying drawings.

BRIEF DESCRIPTION OF THE DRAWINGS

FIGS. 1 through 3 illustrate an internal combustion engine equipped with an intake system in accordance with a first embodiment of the present invention, wherein FIG. 1 is a vertical cross section of essential parts of the engine;

FIG. 2 is a bottom view of part of a cylinder head of FIG. 1 as detached from a cylinder block; and FIG. 3 is a cross section taken on the line III—III in FIG. 2.

FIGS. 4 through 6 illustrate a second embodiment of the present invention, wherein FIG. 4 is a vertical cross section of essential parts of the engine;

FIG. 5 is a bottom view of part of a cylinder head of FIG. 4 as detached from a cylinder block; and FIG. 6 is a cross section taken on the line VI—VI in FIG. 5.

FIGS. 7 and 8 illustrate a third embodiment of the present invention, wherein

FIG. 7 is a bottom view of part of a cylinder head; and

FIG. 8 is a cross section taken on the line VIII—VIII in FIG. 7.

FIG. 9 is a bottom view of part of a cylinder head showing a fourth embodiment of the present invention.

DESCRIPTION OF THE PREFERRED EMBODIMENTS

Figure 1:
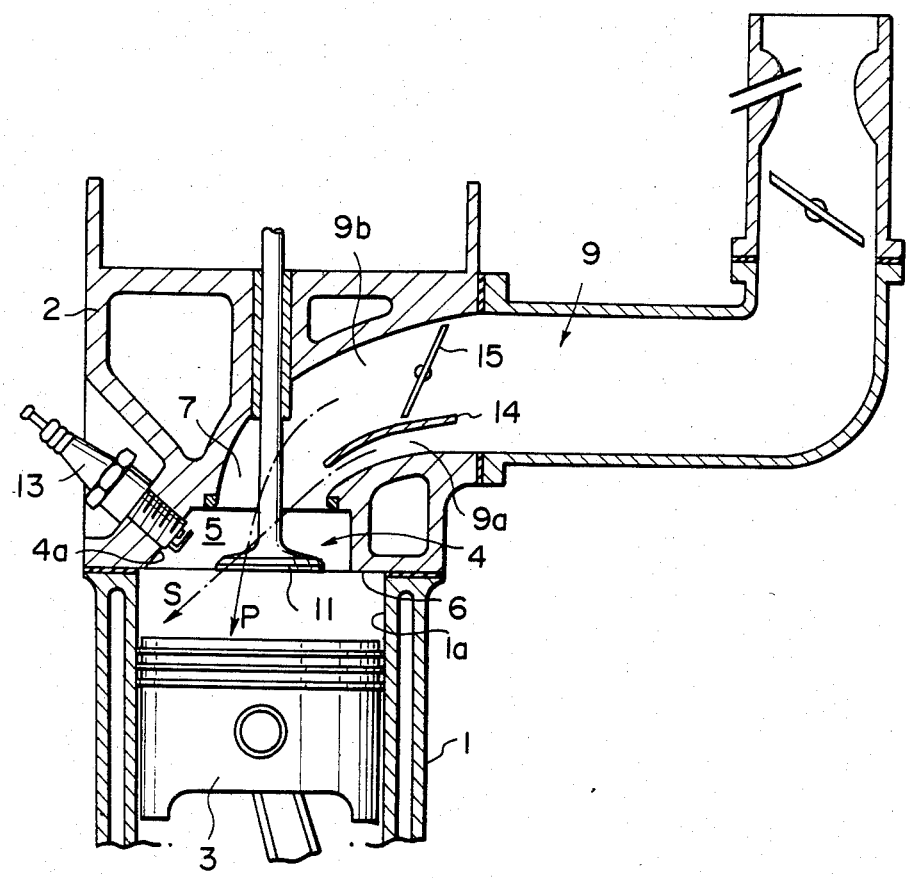

In the drawings and the description which follows, like references are employed to denote the same or corresponding parts or elements throughout several embodiments.

Figure 2:
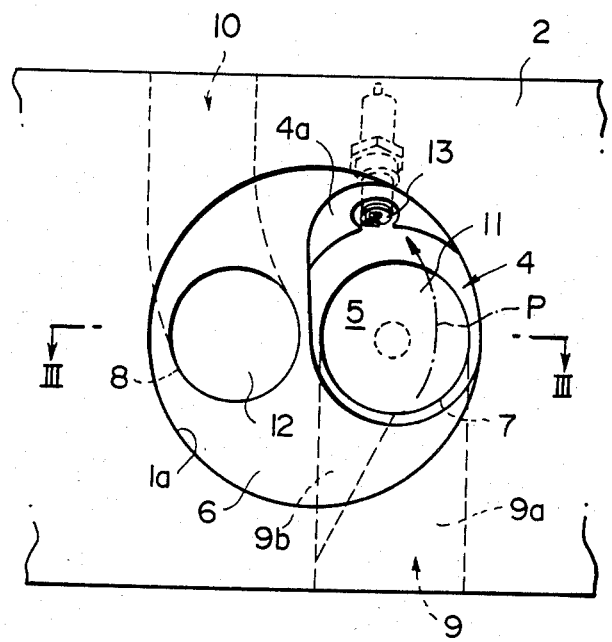
Figure 3:
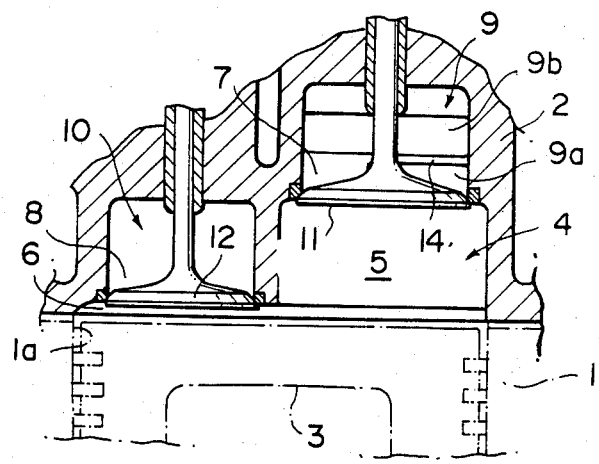

Referring to the drawings and first to FIGS. 1 through 3, there is shown an internal combustion engine embodying the present invention which includes a cylinder block 1 defining therein a cylinder bore 1a, a cylinder head 2 fixedly mounted on the top of the cylinder block 1, and a piston 3 slidably received in the cylinder bore 1a. The cylinder head 2 is formed at its lower inner surface facing the top of the piston 3 with a recess 4 which defines a combustion chamber 5 in cooperation with the top surface of the piston 3 at its top dead-center with a squish area 6 of a limited clearance formed adjacent the recess 4 between the lower inner surface of the cylinder head 2 and the top surface of the piston 3.

The top surface of the piston 3 is substantially flat, and the inner wall surface of the cylinder head 2 defining a part of the squish area 6 is a flat surface substantially flush with the top surface of the cylinder block 1 which mates with the lower surface of the cylinder head 2.

Formed in the cylinder head 2 is an intake port 7 which opens into the recess 4 at its top and is connected to an intake passage 9 opening to one side of the cylinder head 2. Also, formed in the cylinder head 2 is an exhaust port 8 which opens into the squish area 6 and is connected to an exhaust passage 10 opening to the other side of the cylinder head 2.

In the intake port 7 and the exhaust port 8 there are provided an intake valve 11 and an exhaust valve 12, respectively, which are adapted to be in seating engagement with the respective valve seats formed therein so as to close or open these parts.

A spark plug 13 is threaded in the cylinder head 2 with its electrodes projecting into the recess 4 at its slant surface 4a formed on that side of the recess which opposes the flow direction of mixture coming into the combustion chamber 5.

The intake passage 9 includes a light-load intake passage 9a and a heavy-load intake passage 9b which are separated from each other by means of a partition wall 14 disposed near the intake port 7. In the heavy-load intake passage 9b there is provided an opening and closing valve 15 which is operated by an actuator (not shown) to close the heavy-load intake passage 9b fully or to a certain minimum opening during light-load operation of the engine so that the charge of air-fuel mixture is fed to the combustion chamber 5 through the light-load intake passage 9a.

The light-load intake passage 9a has a relatively limited flow area so as to increase the flow speed of the mixture passing therethrough, and opens into the combustion chamber 5 in the circumferential direction of the cylinder bore 1a or in the direction perpendicular to the axis of the intake valve 11, as indicated by an arrow S in FIG. 1, so that the mixture is admitted into the cylinder bore in the circumferential direction thereof to produce a swirl.

On the other hand, the heavy-load intake passage 9b opens into the combustion chamber 5 in the direction parallel to the central axis of the cylinder bore 1a or in the direction parallel to the axis of the intake valve 11, as indicated by an arrow P in FIG. 1, whereby the mixture flowing into the combustion chamber 5 by way of the heavy-load intake passage 9b does not produce any turning flow, thus effectively suppressing the generation of a swirl.

With the above construction, during light-load operation of the engine, the valve 15 is closed and a fresh charge of air-fuel mixture is admitted from the light-load intake passage 9a through the intake port 7 into the combustion chamber 5 in the circumferential direction thereof at an increasing speed of flow. In this case, since the major axis of the substantially elliptical-shaped recess 4, into which the intake port 7 opens, coincides with the direction of flow of the mixture coming therein, the mixture admitted into the recess 4 is prevented from impinging against the inner wall surface of the recess 4, which would otherwise take place immediately after the introduction of mixture into the recess 4. In addition to this, the portion of the wall of the recess 4 opposing the direction of flow of the incoming mixture is formed as a slant surface 4a which serves to ensure the constant flow direction of the mixture so as to maintain the swirl flow of the mixture until the time when the mixture is ignited without abatement of the swirl. This not only enhances the speed of combustion but expedites vaporization and atomization of the mixture so as to improve the combustibility thereof for higher combustion efficiency.

It is also to be noted that the compact formation of the combustion chamber 5 serves to achieve a higher compression ratio of the engine, thus contributing to a further improvement in the combustion efficiency.

Further, at the end of the compression stroke, a squish or squeezed flow of the mixture is produced in the squish area of a limited clearance formed between the inner wall surface of the cylinder head 2 and the top surface of the piston 3 and is squished or pushed out toward the combustion chamber 5 or the recess 4 so that the mixture in the combustion chamber 5 is forced to create a disturbance in an active and positive manner for improved combustion efficiency.

On the other hand, under the heavy-load operating condition of the engine, the valve 15 is opened to permit the introduction of air-fuel mixture into the combustion chamber 5 from the heavy-load intake passage 9b, as a result of which the charging efficiency of the mixture is improved to a material extent so as to provide a higher power output. In this case, it should be noted that the mixture supplied from the heavy-load intake passage 9b acts to suppress the formation of a swirl so that any excessive increase in the combustion speed of the mixture is avoided in an effective manner, thus reducing the combustion noises to below an allowable level.

Figure 5:
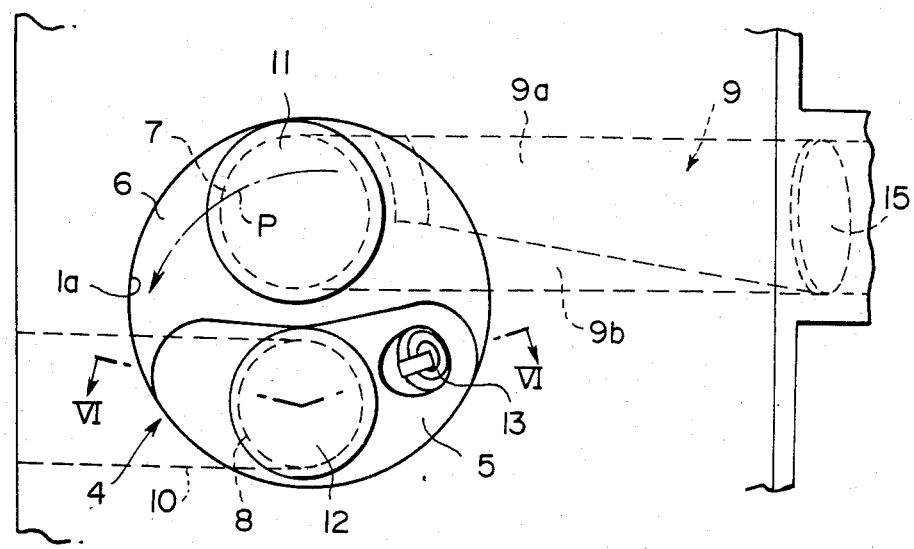
Figure 6:
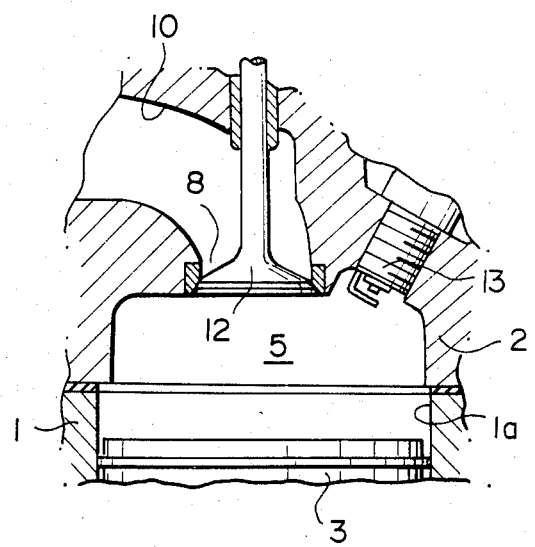

FIGS. 4 to 6 show a second embodiment in which the present invention is applied to a two-valve internal combustion engine, and which differs from the first embodiment, as previously described and shown in FIGS. 1 to 3, in the fact that an exhaust port 8 opens into a recess 4 in the cylinder head 2 whereas an intake port 7 opens into the squish area 6. The remaining construction of this embodiment is substantially identical with that of the first embodiment.

In the second embodiment, during light-load operation of the engine, a charge of mixture first flows into the squish area 6 from the light-load intake passage 9a and then into the combustion chamber 5 at an increased flow speed as it passes through the squish area 6 of limited clearance, thus producing a strong swirl of the mixture within the entire combustion chamber 5 for highly improved combustion efficiency. On the other hand, during the heavy-load operation, the mixture is fed into the combustion chamber 5 from the heavy-load intake passage 9b by way of the squish area 6 so as to suppress the generation of a swirl. As a result, an increase in the combustion speed of the mixture is restricted to reduce the combustion noises.

Figure 7:
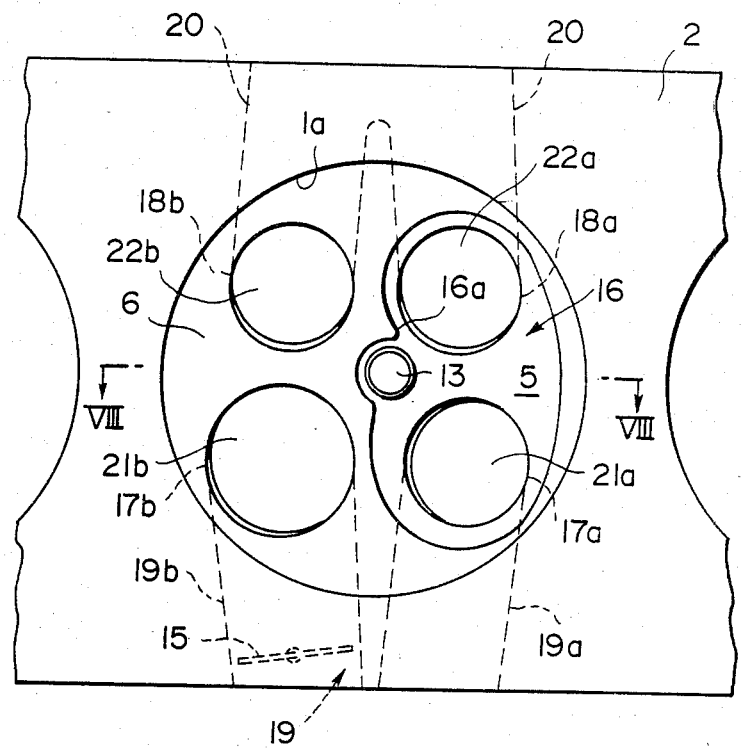
Figure 8:
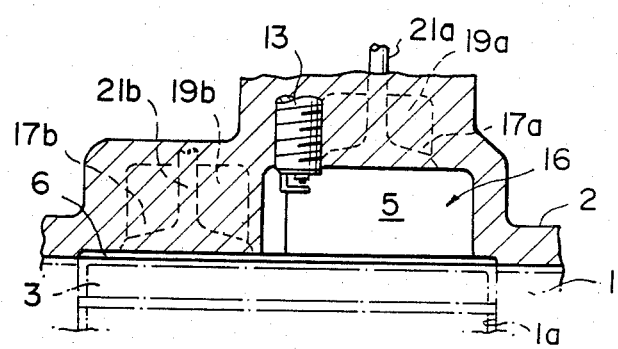

FIGS. 7 and 8 illustrate a third embodiment in which the present invention is applied to a four-valve internal combustion engine having a total of four intake and exhaust valves. As shown in these Figures, a cylinder head 2 is formed at its lower inner surface with a recess 16 which defines, in cooperation with the top surface of a piston 3, a combustion chamber 5 with a squish area 6 of a limited clearance formed adjacent the combustion chamber 5 between the lower inner surface of the cylinder head 2 and the top surface of the piston 3.

A first intake port 17a and a first exhaust port 18a formed in the cylinder head 2 open into the recess 16, whereas a second intake port 17b and a second exhaust port 18b formed in the cylinder head 2 open into the squish area 6.

The first intake port 17a is smaller in cross sectional area than the second intake port 17b, and is connected with a light-load intake passage 19a. The second intake port 17b is connected with a heavy-load intake passage 19b which has therein an opening and closing valve 15 adapted to be closed under light-load condition of the engine. The light-load and the heavy-load intake passage 19a, 19b jointly constitute an intake passage generally designated by reference numeral 19. The first and the second exhaust ports 18a, 18b are merged into a common exhaust passage 20.

The light-load intake passage 19a is smaller in cross sectional area than the heavy-load intake passage 19b so as to serve the purposes of increasing the flow speed of mixture passing therein and of guiding the mixture in the circumferential direction of the cylinder bore 1a. On the other hand, the heavy-load intake passage 19b is formed such that a charge of mixture is admitted into the combustion chamber 5 in the direction parallel to the central axis of the cylinder bore 1a so as to suppress the formation of a swirl.

Disposed in the intake ports 17a, 17b and the exhaust ports 18a, 18b are first and second intake valves 21a, 21b and first and second exhaust valves 22a, 22b, respectively. A spark plug 13 is threaded into the cylinder head 2 with its electrodes projected into the recess 16 at a location between the first intake port 17a and the first exhaust port 18a.

The two intake ports 17a, 17b are juxtaposed at one side of the central axis of the cylinder bore 1a in the longitudinal direction of the engine or in the longitudinal direction of the cylinder head 2, whereas the two exhaust ports 18a, 18b are juxtaposed at the opposite side of the central axis of the cylinder bore 1a in the longitudinal direction of the cylinder head 2. The recess 16 in the cylinder head 2 is designed such that it has its major axis arranged in the direction perpendicular to the longitudinal direction of the engine or to the longitudinal direction of the cylinder head 2, as a result of which a charge of air-fuel mixture flowing from the light-load intake passage 19a into the combustion chamber 5 is effectively prevented from direct impingement against the peripheral wall of the recess 16, thus ensuring good swirl formation.

The peripheral wall of the recess 16 is partially projected inwardly at a location near the spark plug 13 so as to form a projection 16a at the side of the spark plug 13 facing toward the flow direction of the mixture, the projection 16a acting to locally suppress any significant disturbances of the mixture around the electrodes of the spark plug 13 for improved ignitability of the mixture.

With this embodiment, during light-load operation of the engine, the opening and closing valve 15 is closed and a charge of air-fuel mixture is fed to the combustion chamber 5 by way of the light-load intake passage 19a while producing a swirl for the purpose of increasing the combustion speed of the mixture. On the other hand, under heavy-load operation, the valve 15 is opened to admit the mixture into the combustion chamber 5 by way of the heavy-load intake passage 19b while suppressing the generation of a swirl so that the combustion speed of the mixture is restricted to reduce the noises of combustion to a substantial extent.

In addition, in this embodiment, the flow of mixture at a relatively cool temperature admitted into the recess 16 is heated to a high temperature by contact with the hot first exhaust valve 22a so that the combustibility of the mixture is improved to a material extent for increased combustion efficiency.

FIG. 9 shows a further embodiment of a four-valve internal combustion engine constructed according to the present invention. In this embodiment, a recess 23 in the lower inner wall surface of the cylinder head 2 is designed such that its major axis is disposed in the longitudinal direction of the engine. First and second exhaust ports 18a, 18b open into the recess 23 whereas first and second intake ports 17a, 17b open into the squish area 6. The remaining construction of this embodiment is identical with the above-described embodiment as shown in FIGS. 7 and 8.

In this embodiment, during light-load operation of the engine, the mixture is fed to the combustion chamber 5 from the light-load intake passage 19a through the squish area 6, giving rise to a swirl for increased combustion speed of the mixture. On the other hand, during heavy-load operation, the mixture is admitted into the combustion chamber 5 from the heavy-load intake passage 19b through the squish area 6 so as to suppress the generation of a swirl, whereby the combustion speed of the mixture is restricted for reduction in the level of combustion noises.

It should be appreciated that the present invention is not limited to the above-described constructions but may include various modifications thereof. Specifically, in a case where the present invention is applied to a three-valve engine having two intake ports and one exhaust port, the two intake ports may open into the recess. Also, in case of four-valve engines as previously described in respect of the embodiments, shown in FIGS. 7, 8 and FIG. 9, respectively, two intake ports 7 may open into the recess. It is obvious that the present invention is fully applicable to these engines as referred to above and, when applied, will attain substantially the same effects as set forth above.

To summarize, according to the present invention, in a high compression-ratio engine wherein the inner wall surface of the cylinder head is partially recessed at a location opposing the top of the piston so as to define therein a combustion chamber with a squish area of a limited clearance formed adjacent thereto, an intake passage is constructed of a light-load intake passage, which is adapted to produce a swirl of air-fuel mixture, and a heavy-load intake passage, which serves to suppress the generation of a swirl. With such a construction, during light-load operation of the engine, it is possible not only to achieve a high compression ratio but also to create a swirl of the mixture so that the combustion speed of the mixture is increased to improve the combustion efficiency and hence the fuel economy as well. On the other hand, during heavy-load operation of the engine such as when the engine is operating at high speed with the throttle valve fully opened, a rise in the combustion speed of the mixture can be effectively suppressed so as to reduce the combustion noises to a substantial extent.

We claim:

1. An intake system in an internal combustion engine comprising a cylinder block defining therein a cylinder bore; a piston slidably received in said cylinder bore; a cylinder head fixedly mounted on said cylinder block and having a recess formed in its inner wall at a location opposing the top of said piston; a combustion chamber defined in said recess in said cylinder head with a squish area of a limited clearance formed adjacent thereto between the inner wall surface of said cylinder head and the top surface of said piston at its top dead-center; intake port means in said cylinder head opening into at least one of said combustion chamber and said squish area; intake passage means in said cylinder head connected with said intake port means for feeding a charge of air-fuel mixture to said combustion chamber through said intake port means; exhaust port means in said cylinder head opening into at least one of said combustion chamber and said squish area; exhaust passage means in said cylinder head connected with said exhaust port means for discharging burned gas from said combustion chamber to the outside; said intake passage means comprising a light-load intake passage for introducing the mixture into said combustion chamber or said squish area in the circumferential direction of said cylinder bore so as to produce a swirl under light-load operation of the engine, and a heavy-load intake passage having an opening and closing valve adapted to be closed during light-load operation of the engine and opened during heavy-load operation of the engine for introducing the mixture into said combustion chamber or said squish area in the direction parallel to the central axis of said cylinder bore so as to suppress the generation of a swirl.

2. An intake system in an internal combustion engine comprising a cylinder block defining therein a cylinder bore; a piston slidably received in said cylinder bore; a cylinder head fixedly mounted on said cylinder block and having a recess formed in its inner wall at a location opposing the top of said piston; a compact combustion chamber defined in said recess in said cylinder head with a large squish area of a limited clearance formed adjacent thereto between the inner wall surface of said cylinder head and the top surface of said piston at its top dead-center; at least one intake port and at least one exhaust port opening into said cylinder at the inner wall surface of said cylinder head opposing the top of said piston; at least one of said ports opening into said large squish area and the other ports opening into said combustion chamber; intake passage means in said cylinder head connected with said at least one intake port for feeding a charge of air-fuel mixture to said combustion chamber through said at least one intake port; exhaust passage means in said cylinder head connected with said at least one exhaust port for discharging burned gas from said combustion chamber to the outside; said intake passage means comprising a light-load intake passage for introducing the mixture into said combustion chamber or said squish area in the circumferential direction of said cylinder bore so as to produce a swirl under light-load operation of the engine, and a heavy-load intake passage having an opening and closing valve adapted to be closed during light-load operation of the engine for introducing the mixture into said combustion chamber or said squish area in the direction parallel to the central axis of said cylinder bore so as to suppress the generation of a swirl.

3. An intake system in an internal combustion engine as defined in claim 2, wherein said at least one intake port opens into said combustion chamber.

4. An intake system in an internal combustion engine as defined in claim 3, wherein the inner wall of said cylinder head forming a part of said combustion chamber has a slant surface formed at a location opposing the direction of flow of the mixture admitted into said combustion chamber from said light-load intake passage.

5. An intake system in an internal combustion engine as defined in claim 2, wherein said at least one intake port comprises a first intake port with a first intake valve provided therein and a second intake port with a second intake valve provided therein, said light-load intake passage being in communication with said combustion chamber through said first intake port and formed in such a manner as to direct the mixture in a tangential direction of said cylinder bore, as viewed in the axial direction of the latter, so as to produce a swirl in said combustion chamber, said heavy-load intake passage being in communication with said combustion chamber through said second intake port and formed in such a manner as to direct the mixture in the direction to develop a counter flow opposing the swirl produced by said light-load intake passage.

6. An intake system in an internal combustion engine as defined in claim 5, wherein said first intake port connected with said light-load intake passage opens into said squish area.

7. An intake system in an internal combustion engine as defined in claim 6, wherein the top surface of said piston is substantially flat, and the inner wall surface of said cylinder head defining a part of said squish area is a flat surface substantially flush with the top surface of said cylinder block which mates with the lower surface of said cylinder head.

8. An intake system in an internal combustion engine as defined in claim 5, wherein said first intake port connected with said light-load intake passage opens into said combustion chamber.

9. An intake system in an internal combustion engine as defined in claim 6 or 8, wherein said second intake port connected with said heavy-load intake passage opens into said squish area.

10. An intake system in an internal combustion engine comprising a cylinder block defining therein a cylinder bore; a piston slidably received in said cylinder bore; a cylinder head fixedly mounted on said cylinder block and having a recess formed in its inner wall at a location opposing the top of said piston; a compact combustion chamber defined in said recess in said cylinder head with a large squish area of a limited clearance formed adjacent thereto between the inner wall surface of said cylinder head and the top surface of said piston at its top dead-center; at least one intake port and at least one exhaust port opening into said cylinder at the inner wall surface of said cylinder head opposing the top of said piston; at least one of said ports opening into said large squish area and the other ports opening into said combustion chamber; intake passage means in said cylinder head connected with said at least one intake port for feeding a charge of air-fuel mixture to said combustion chamber through said at least one intake port; exhaust passage means in said cylinder head connected with said at least one exhaust port for discharging burned gas from said combustion chamber to the outside; said intake passage means comprising a light-load intake passage for introducing the mixture into said combustion chamber or said squish area in the circumferential direction of said cylinder bore so as to produce a swirl under light-load operation of the engine, and a heavy-load intake passage having an opening and closing valve adapted to be closed during light-load operation of the engine and opened during heavy-load operation of the engine for introducing the mixture into said combustion chamber or said squish area in the direction parallel to the central axis of said cylinder bore so as to suppress the generation of a swirl; said intake port communicated with said light-load intake passage opening into said squish area.

11. An intake system in an internal combustion engine as defined in claim 10, wherein the top surface of said piston is substantially flat, and the inner wall surface of said cylinder head defining a part of said squish area is a flat surface substantially flush with the top surface of said cylinder block which mates with the lower surface of said cylinder head.

12. An intake system in an internal combustion engine as defined in claim 10, wherein said at least one intake port comprises a single intake port and an intake valve is provided therein, said light-load intake passage and said heavy-load intake passage extending toward the vicinity of said intake port independently of each other, said light-load intake passage having one end connected with said intake port in a direction substantially perpendicular to the axis of said intake valve.

13. An intake system in an internal combustion engine as defined in claim 12, wherein said light-load intake passage is formed at its one end near said intake port in such a manner as to direct the mixture toward that portion of said combustion chamber which lies away from the axis of said intake valve and near the inner circumferential surface of said cylinder bore, one end of said heavy-load intake passage near said intake port being formed in such a manner as to direct the mixture in a direction parallel to the axis of said intake valve.

14. An intake system in an internal combustion engine as defined in claim 10, further comprising a spark plug in said cylinder head having its electrodes projected into said combustion chamber, said electrodes being located downstream of said intake valve in said intake port or an exhaust valve in said exhaust port means as viewed in the direction of flow of the mixture admitted from said light-load intake passage into the combustion chamber.

15. An intake system in an internal combustion engine comprising a cylinder block defining therein a cylinder bore; a piston slidably received in said cylinder bore; a cylinder head fixedly mounted on said cylinder block and having a recess formed in its inner wall at a location opposing the top of said piston; a compact combustion chamber defined in said recess in said cylinder head with a large squish area of a limited clearance formed adjacent thereto between the inner wall surface of said cylinder head and the top surface of said piston at its top dead-center; two intake ports provided with intake valves respectively and at least one exhaust port opening into said cylinder at the inner wall surface of said cylinder head opposing the top of said piston; one of said intake ports opening into said large squish area and the other of said two intake ports opening into said combustion chamber; intake passage means in said cylinder head connected with said intake ports for feeding a charge of air-fuel mixture to said combustion chamber through said intake ports; exhaust passage means in said cylinder head connected with said said at least one exhaust port for discharging burned gas from said combustion chamber to the outside; said intake passage means comprising a light-load intake passage connected with one of said intake ports for introducing the mixture into said squish area in the circumferential direction of said cylinder bore so as to produce a swirl under light-load operation of the engine, and a heavy-load intake passage connected with the other intake port, having an opening and closing valve therein, said valve being closed during light-load operation of the engine and opened during heavy-load operation of the engine for introducing the mixture into said combustion chamber in the direction parallel to the central axis of said cylinder bore so as to suppress the generation of a swirl.

* * * * *